3,488,923
SOLVENT EXTRACTION OF
HYDROGEN HALIDES
William M. Hutchinson, Bartlesville, Okla., assignor to
Phillips Petroleum Company, a corporation of Delaware
No Drawing. Filed Feb. 8, 1968, Ser. No. 703,860
Int. Cl. B01d 11/00
U.S. Cl. 55—71                         8 Claims

ABSTRACT OF THE DISCLOSURE

Separation of hydrogen halides from gaseous mixtures containing same by contacting with solvent mixtures comprising (a) a phenolic compound and (b) a polyether with or without (c) a zinc chloride or zinc bromide.

BACKGROUND OF THE INVENTION

This invention relates to a novel process for separation of a hydrogen halide from mixtures containing same. In accordance with another aspect, this invention relates to the recovery of hydrogen chloride and/or hydrogen bromide from gaseous mixtures containing same by contacting with a solvent system comprising a phenolic compound and a polyether with or without zinc chloride or zinc bromide. In accordance with a further aspect, this invention relates to the recovery of hydrogen chloride from gaseous mixtures containing same produced by dehalogenation of chloro fluoro carbon compounds whereby the hydrogen chloride is selectively absorbed in the presence of other materials present in the dehalogenation effluent.

A primary object of the present invention is to provide a process for efficient separation of a hydrogen halide from gaseous mixtures containing same.

Another object of this invention is to provide a process for selectively extracting hydrogen chloride and/or hydrogen bromide from gaseous mixtures containing same with a novel solvent mixture.

Other objects, aspects as well as the several advantages of the invention will be apparent to those skilled in the art upon further consideration of the specification and the appended claims.

SUMMARY OF THE INVENTION

In accordance with this invention, hydrogen halides are separated from gaseous mixtures containing same by selective extraction with a solvent mixture comprising at least one phenolic compound and at least one polyether with or without a zinc halide.

In accordance with one embodiment of the invention, gaseous mixtures containing hydrogen chloride and/or hydrogen bromide and one or more other substances are contacted by a solvent mixture comprising at least one phenolic compound and at least one polyether together with zinc chloride or zinc bromide to selectively absorb hydrogen chloride and/or hydrogen bromide.

In accordance with a further embodiment of this invention, it has been found that the solvent extraction of hydrogen chloride and/or hydrogen bromide from gaseous mixtures containing same can be more effectively carried out with the solvent mixture of the invention by conducting the solvent extraction operation at relatively low temperatures.

DESCRIPTION OF THE PREFERRED EMBODIMENT

The phenolic compounds that can be employed according to the invention have a formula selected from

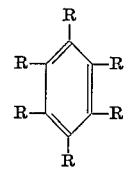

and

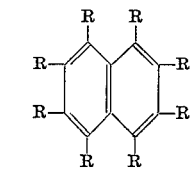

wherein R is selected from hydrogen, alkyl radicals having from 1 to 4 carbon atoms and hydroxy radicals, the number of hydroxy radicals in each molecule of said phenolic compound being 1 or 2, and the number of carbon atoms in each molecule of said phenolic compound being within the range of 6 to about 18.

Examples of some phenolic compounds which can be employed in the process of this invention include phenol, o-cresol, m-cresol, p-cresol, o-ethylphenol, m-isopropylphenol, p-tert-butylphenol, 2,3-xylenol, 2-ethyl-4-propylphenol, 2,3,4,6 - tetraethylphenol, pentamethylphenol, 2,4,6-tributylphenol, pyrocatechol, 3-methylpyrocatechol, 4-propylpyrocatechol, resorcinol, 2-ethylresorcinol, 5-butylresorcinol, hydroquinone, 2,6-dimethylhydroquinone, isopropylhydroquinone, 1-naphthol, 2-napthol, 4-methyl-1-naphthol, 7-ethyl-2-naphthol, 2-methyl-6-isopropyl-1-napthtol, heptamethyl-2-naphthol, 3-methyl-5-propyl-8-butyl-1-naphthol, 1,2-naphthalenediol, 2,3-naphthalenediol, 1,4 - naphthalenediol, 1,5 - naphthalenediol, 2,6-naphthalenediol, 1,7-naphthalenediol, 1,8-naphthalenediol, 6-methyl - 1,2 - naphthalenediol, 2-tert-butyl-1,4-naphthalenediol, 2-ethyl-5-propyl-1,6-naphthalenediol, and the like, and mixtures thereof.

The polyethers that can be employed according to the invention have the formula $CH_3O(CH_2CH_2O)_nCH_3$, wherein $n$ is an integer of 2–6, preferably 3 or 4.

Examples of polyethers which can be employed in the process of this invention include the dimethyl ether of diethylene glycol, the dimethyl ether of triethylene glycol, the dimethyl ether of tetraethylene glycol, the dimethyl ether of pentaethylene glycol, the dimethyl ether of hexaethylene glycol, and mixtures thereof.

In a preferred embodiment of the invention, the solvent system of phenolic compound and polyether additionally contains at least one zinc halide selected from zinc chloride and zinc bromide. When the hydrogen halide in the gaseous mixture is hydrogen chloride or hydrogen chloride and hydrogen bromide, zinc chloride is the preferred zinc halide. When the hydrogen halide in the gaseous mixture is hydrogen bromide, zinc bromide is the preferred zinc halide. As an advantage, the presence of zinc halide in the solvent system inhibits corrosion of certain materials of construction, e.g., stainless steel, which can be used in the separation process.

The process of this invention is applicable to the separation of hydrogen halide from gaseous mixtures containing hydrogen chloride and/or hydrogen bromide and one or more of a number of other substances. Examples of some substances from which hydrogen chloride and/or hydrogen bromide can be thus separated include hydrocarbons such as methane, ethane, propane, butane, isobutane, hexane, cyclopentane, methylcyclopentane, cyclohexane, ethylene, propylene, isobutylene, 1-butene, 2-butene, acetylene, methylacetylene, cyclopentene, cyclohexene, and benzene; halogenated hydrocarbons such as carbon tetrachloride, chloroform, methylene chloride, methyl chloride, methyl bromide, ethyl chloride, propyl bromide, butyl chloride, isopropyl bromide, isobutyl chloride, 1,2-dichloroethane, carbon tetrafluoride, fluoroform, methylene fluoride, methyl fluoride, 1,2-difluoroethane, 1,1,2,2-tetrafluoroethane, 1,1,1,2-tetrafluoroethane, hexafluoroethane, 1,1,2,2-tetrafluorocyclobutane, octafluorocyclobutane, vinyl fluoride, 1,2-difluoroethylene, 1,1-difluoroethylene, trifluoroethylene, tetrafluoroethylene, 1,2-dichlorotetrafluoroethane, chlorotrifluoroethylene, bromotrifluoroethylene, and 1-chloro-2-bromoethylene; and inorganic gases such as hydrogen, nitrogen, carbon monoxide, carbon dioxide, helium, neon, and argon. The process is especially useful for separating hydrogen halide from reaction mixtures containing hydrogen halide resulting from the chlorination, bromination, dechlorination, or debromination of organic substances.

The process is particularly useful for separating hydrogen chloride from dehalogenation reaction mixtures resulting from the dehalogenation of 1,2-dichlorotetrafluoroethane by reaction with hydrogen, e.g., in processes such as those disclosed in U.S. Patents 2,615,925 and 2,697,124 and Belgium Patent 653,363. It is within the scope of the invention to treat such dehalogenation effluent mixtures first to remove hydrogen fluoride before contacting with the solvent mixture of the invention whereby hydrogen chloride is selectively removed following removal of hydrogen fluoride. Thus, when the process of the invention is employed following removal of hydrogen fluoride from dehalogenation reaction effluents, hydrogen fluoride and hydrogen chloride are separated from each other as well as from the reaction mixture. Any residual hydrogen halide remaining in the reaction mixture can be removed readily, for example, by contacting with water or aqueous caustic.

Although the ratio of phenolic compound to polyether in the solvent system can vary over a broad range, the weight ratio of phenolic compound to polyether will generally be within the range of about 0.05:1 to 2:1, preferably being within the range of about 0.1:1 to 1.5:1. When zinc halide is used in the solvent system, the zinc halide will generally constitute not more than about 12 weight percent of the solvent system, preferably constituting about 2 to 8 weight percent of the solvent system.

Although the scrubbing of hydrogen chloride and/or hydrogen bromide from the gaseous mixture by the process of this invention can be carried out over a considerable temperature range, the temperature will generally be within the range of about −40° C. to 60° C., preferably being within the range of about −10° C. to 35° C.

The hydrogen chloride and/or hydrogen bromide are readily recovered from the solvent system by the application of heat. Although a considerable range of temperatures can be used in this stripping of hydrogen halide from the solvent system, the temperature will generally be within the range of about 90° C. to 220° C., preferably being within the range of about 130° C. to 180° C. The temperature during the stripping operation should be at least 50° C. higher than that used in the scrubbing operation. Although the stripping operation can be carried out at a pressure substantially above or below atmospheric, approximately atmospheric pressure is preferred. If desired, a purge gas such as air, flue gas, nitrogen, carbon dioxide, helium, neon, argon, or the like can be passed through the solvent system after the stripping operation to aid in removing traces of hydrogen halide remaining in the solvent system.

Although either the scrubbing or the stripping operation can be carried out batchwise, continuous operation is preferred for both scrubbing and stripping.

Example I

The solubility of hydrogen chloride at various pressures in various solvents at 30° C. was determined. The results of these determinations are summarized in Table I.

TABLE I

| Solvent:[1] | Pressure, mm. Hg | Solubility, g. HCl/ 100 g. solvent |
|---|---|---|
| A | 10 | 0.43 |
| A | 27 | 0.98 |
| A | 54 | 1.77 |
| A | 98 | 2.63 |
| A | 222 | 5.20 |
| B | 22 | 0.44 |
| B | 86 | 1.32 |
| B | 220 | 2.78 |
| C | 16 | 0.22 |
| C | 35 | 0.42 |
| C | 68 | 0.70 |
| D | 28 | 0.13 |
| D | 58 | 9.42 |
| D | 85 | 0.76 |
| D | 121 | 1.12 |

[1] A is 26.2 percent phenol, 68.0 percent dimethyl ether of triethylene glycol, and 5.8 percent zinc chloride, by weight; B is 48.2 percent phenol and 51.8 percent dimethyl ether of triethylene glycol, by weight; C is 55.2 percent phenol, 33.7 percent dimethyl ether of triethylene glycol, and 11.1 percent zinc chloride, by weight; D is dimethyl ether of triethylene glycol.

The data in Table I show that the solvent systems comprising phenol and dimethyl ether of triethylene glycol, and especially those containing 5.8 weight percent zinc chloride and no zinc chloride, are suitable solvents for hydrogen at 30° C., are better solvents for hydrogen chloride than is the dimethyl ether of triethylene glycol alone.

Example II

The solubility of hydrogen chloride at various pressures in a solvent system consisting of 26.2 weight percent phenol, 68.0 weight percent dimethyl ether of triethylene glycol, and 5.8 weight percent zinc chloride was determined at various temperatures. The results of these determinations are summarized in Table II. For comparative purposes, the results at 30° C. are a repetition of results shown in Table I.

TABLE II

| Temperature, ° C.: | Pressure, mm. Hg | Solubility, g. HCl/ 100 g. solvent |
|---|---|---|
| 0 | 2 | 0.08 |
| 0 | 6 | 0.64 |
| 0 | 26 | 2.69 |
| 0 | 102 | 5.55 |
| 30 | 10 | 0.43 |
| 30 | 27 | 0.98 |
| 30 | 54 | 1.77 |
| 30 | 98 | 2.63 |
| 30 | 222 | 5.20 |
| 99 | 48 | 0.17 |
| 99 | 113 | 0.25 |
| 99 | 233 | 0.47 |
| 99 | 405 | 0.72 |
| 150 | 59 | 0.03 |
| 150 | 354 | 0.09 |
| 150 | 543 | 0.17 |

The data in Table II show that at 0° C. and 30° C. the solvent system employed is a good solvent for hydrogen chloride, and that at 99° C. and especially at 150° C. the solubility of hydrogen chloride in the solvent system is quite low. Thus, hydrogen chloride is readily absorbed by the solvent system at low temperatures, and is easily stripped from the solvent system at higher temperatures.

The solubility of tetrafluoroethylene at 13 mm. Hg in the solvent system consisting of 26.2 weight percent phenol, 68.0 weight percent dimethyl ether or triethylene glycol, and 5.8 weight percent zinc chloride, at 0° C., was found to be only 0.01 g./100 g. solvent. The solubility of tetrafluoroethylene at 504 mm. Hg in the same solvent system at 0° C. was found to be only 0.17 g./100 g. solvent. Thus, this solvent can be used to selectively extract hydrogen chloride from a mixture comprising hydrogen chloride and tetrafluoroethylene.

Although the above examples referred to the separation of hydrogen chloride from mixtures containing same, it is obvious that the present invention is applicable to the removal of other hydrogen halides, such as hydrogen bromide or hydrogen iodide, or mixtures of the hydrogen halides from gaseous or vaporous mixtures thereof with organic compounds of the type or classes described above.

I claim:
1. A process for the separation of hydrogen halides from gaseous mixtures containing same which comprises contacting said gaseous mixture with a solvent mixture comprising:
(a) at least one phenolic compound having a formula of

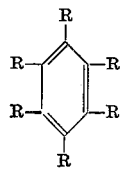

or

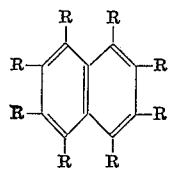

wherein R is selected from hydrogen, alkyl radicals having 1 to 4 carbon atoms, and hydroxy radicals, the number of hydroxy radicals in each molecule of said phenolic compound being 1 or 2, and the number of carbon atoms in each molecule of said phenolic compound being within the range of 6 to 18, and (b) at least one polyether having the formula $CH_3O(CH_2CH_2O)_nCH_3$, wherein $n$ is an integer of 2 to 6, under conditions whereby substantial absorptions of the hydrogen halide in said solvent mixture is effected while the remainder of said mixture is substantially unaffected.

2. A process according to claim 1 wherein the weight ratio of (a) to (b) is in the range of about 0.05:1 to 2:1.

3. A process according to claim 1 wherein said contacting is effected at a temperature in the range of −40° C. to 60° C.

4. A process according to claim 1 wherein said solvent mixture additionally contains (c) zinc chloride or zinc bromide, and wherein the amount of zinc halide used does not exceed 12 weight percent of the solvent system.

5. A process according to claim 1 wherein said hydrogen halide is recovered from the solvent mixture by heating to a temperature of at least 50° C. above the contacting temperature.

6. A process according to claim 1 wherein said gaseous mixture is obtained as the effluent of a dehalogenation reaction for chloro fluoro carbon compounds to produce organic compounds and hydrogen chloride and hydrogen fluoride wherein hydrogen chloride is selectively absorbed by contacting with the solvent mixture.

7. A process according to claim 1 wherein said gaseous mixture contains at least one of hydrogen chloride and hydrogen bromide.

8. A process according to claim 7 wherein said gaseous mixture contains hydrogen chloride and said solvent mixture is (a) phenol, (b) dimethyl ether of triethylene glycol, and (c) zinc chloride.

References Cited
UNITED STATES PATENTS 2,615,925 10/1952 Bordher _____ 260—653.5
2,697,124 12/1954 Mantell _____ 260—653.5

REUBEN FRIEDMAN, Primary Examiner

C. N. HART, Assistant Examiner